United States Patent
Sue et al.

(10) Patent No.: US 10,663,752 B2
(45) Date of Patent: May 26, 2020

(54) OPTICAL UNIT WITH SHAKE CORRECTION FUNCTION AND MANUFACTURING METHOD THEREFOR

(71) Applicant: NIDEC SANKYO CORPORATION, Suwa-gun, Nagano (JP)

(72) Inventors: Takeshi Sue, Nagano (JP); Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 47 days.

(21) Appl. No.: 15/386,508

(22) Filed: Dec. 21, 2016

(65) Prior Publication Data

US 2017/0176766 A1 Jun. 22, 2017

(30) Foreign Application Priority Data

Dec. 21, 2015 (JP) .................................. 2015-248438

(51) Int. Cl.
*G02B 27/64* (2006.01)
*G02B 7/02* (2006.01)

(52) U.S. Cl.
CPC ............. *G02B 27/646* (2013.01); *G02B 7/02* (2013.01); *G02B 27/64* (2013.01)

(58) Field of Classification Search
CPC . G02B 7/00; G02B 7/003; G02B 7/02; G02B 7/021; G02B 7/04; G02B 7/09; G02B 7/10; G02B 27/00; G02B 27/64; G02B 27/646

See application file for complete search history.

(56) References Cited

U.S. PATENT DOCUMENTS

| | | | |
|---|---|---|---|
| 8,396,357 B2 * | 3/2013 | Yanagisawa | G02B 7/08 348/208.7 |
| 2011/0235198 A1 * | 9/2011 | Furuya | G02B 7/08 359/824 |
| 2012/0070138 A1 * | 3/2012 | Onishi | G02B 7/102 396/55 |
| 2013/0136437 A1 * | 5/2013 | Asakawa | G03B 5/00 396/55 |
| 2019/0235267 A1 * | 8/2019 | Minamisawa | G02B 27/646 |

FOREIGN PATENT DOCUMENTS

JP 2015064501 A 4/2015

* cited by examiner

*Primary Examiner* — Thong Q Nguyen
(74) *Attorney, Agent, or Firm* — Cantor Colburn LLP

(57) ABSTRACT

An optical unit may include a movable body including a holder which holds an optical module on its inner side; a fixed body which swingably supports the movable body through a support mechanism; and a shake correction drive mechanism structured to swing the movable body. An end part on one side in an optical axis direction of the fixed body may be structured to be an opened end. The movable body may include a protruded part which is protruded to the one side in the optical axis direction through the opened end. The fixed body may include a swing restriction part at the opened end which is configured to abut with the protruded part when the movable body is swung to restrict a swing range of the movable body.

17 Claims, 6 Drawing Sheets

OPTICAL UNIT WITH SHAKE CORRECTION FUNCTION AND MANUFACTURING METHOD THEREFOR

CROSS REFERENCE TO RELATED APPLICATION

The present invention claims priority under 35 U.S.C. § 119 to Japanese Application No. 2015-248438 filed Dec. 21, 2015, the entire content of which is incorporated herein by reference.

FIELD OF THE INVENTION

At least an embodiment of the present invention may relate to an optical unit with a shake correction function and a manufacturing method therefor.

BACKGROUND

In order to restrain disturbance of a photographed image due to a shake of hand and a swing, an optical unit with a shake correction function has been proposed in which a movable body provided with a holder holding an optical module is swung for correcting the shake. In the optical unit with a shake correction function, a structure is common that an optical module is held on an inner side of the holder which is held by the movable body and a bottom plate which covers the movable body is provided in a fixed body on one side in an optical axis direction (see, for example, Japanese Patent Laid-Open No. 2015-64501). Further, in the optical unit with a shake correction function described in the Patent Literature, a structure is adopted that a swing restriction member is provided between a case covering the movable body and the bottom plate and a swing range when the movable body is swung is restricted by the swing restriction member.

In the optical unit with a shake correction function described in the Patent Literature, if the bottom plate is not used, a dimension in the optical axis direction of the optical unit with a shake correction function is reduced. Further, if the bottom plate is not used, one end side in the optical axis direction of the fixed body is opened. Therefore, in this case, it may be structured that a holder is previously mounted on an inner side of the fixed body and, after that, an optical module can be mounted on an inner side of the holder which is disposed on an inner side of the fixed body through the open end of the fixed body. However, in a case that the above-mentioned structure is adopted, a space for providing a swing restriction member is not secured at a midway position in the optical axis direction of the fixed body. Therefore, a stopper mechanism for restricting a swing range of the movable body is unable to be provided.

SUMMARY

In view of the problem described above, at least an embodiment of the present invention may advantageously provide an optical unit with a shake correction function which is capable of providing a stopper mechanism structured to restrict a swing range of a movable body even when one side in an optical axis direction of a fixed body is structured to be an opened end.

According to at least an embodiment of the present invention, there may be provided an optical unit with a shake correction function including a movable body having a holder which holds an optical module on its inner side, a fixed body which swingably supports the movable body through a support mechanism, and a shake correction drive mechanism structured to swing the movable body. An end part on one side in an optical axis direction of the fixed body is structured to be an opened end, the movable body is provided with a protruded part which is protruded to the one side in the optical axis direction through the opened end, and the fixed body is provided with a swing restriction part at the opened end which is configured to abut with the protruded part when the movable body is swung to restrict a swing range of the movable body.

In the optical unit with a shake correction function in accordance with at least an embodiment of the present invention, an end part on one side in an optical axis direction of a fixed body is structured to be an opened end and the fixed body includes no bottom plate which covers a movable body on the one side in the optical axis direction. Therefore, a dimension in the optical axis direction of the optical unit with a shake correction function can be reduced. Further, a bottom plate is not provided and thus, a holder is previously mounted on an inner side of the fixed body and, after that, an optical module can be mounted on an inner side of the holder through the opened end of the fixed body. Therefore, the optical unit with a shake correction function can be manufactured efficiently. Further, a swing restriction part structured to restrict a swing range of the movable body is provided at the opened end of the fixed body and thus an excessive swing of the movable body can be prevented. Therefore, damages of the movable body, the fixed body and the support mechanism due to an excessive swing of the movable body can be restrained.

In at least an embodiment of the present invention, it is preferable that the swing restriction part is formed to be an inclined face which is obliquely inclined with respect to the optical axis direction and is capable of surface-contacting with a side face of the protruded part. According to this structure, the protruded part and the swing restriction part are surface-contacted with each other and thus damages of the protruded part and the swing restriction part can be restrained.

In at least an embodiment of the present invention, it may be structured that the one side in the optical axis direction is an image side in the optical axis direction, the movable body includes a stopper member which is connected with an end part on the one side in the optical axis direction of the holder, and the stopper member structures the protruded part. According to this structure, the holder and the stopper member can be respectively structured in appropriate structures corresponding to their functions. In this case, it may be structured that the holder includes a frame part whose planar shape when viewed in the optical axis direction is a substantially square shape, the stopper member is formed in a frame shape so as to correspond to an outside shape of the frame part, and the swing restriction part disposed at the opened end of the fixed body is disposed so as to surround the stopper member in the frame shape. In addition, it may be structured that the fixed body includes a case which covers the cover from an outer side, the case is provided with a body part whose outward shape when viewed in the optical axis direction is a substantially square shape, a wall part is disposed at each of side end edges of the frame part which is the substantially square shape, a coil structuring the shake correction drive mechanism is attached to the wall part, and a magnet structuring the shake correction drive mechanism is held on an inner face of the body part of the case so as to face the coil.

In at least an embodiment of the present invention, it is preferable that hardness of the stopper member is lower than that of the holder. According to this structure, an impact when the protruded part and the swing restriction part are contacted with each other can be made small. Further, an abutting noise when the protruded part and the swing restriction part are contacted with each other can be made small. The phrase that "hardness is low" in at least an embodiment of the present invention means soft material or elastically deformable material.

In at least an embodiment of the present invention, it is preferable that a weight is connected with at least one of an end part of the optical module on the other side in the optical axis direction and an end part of the holder on the other side in the optical axis direction. According to this structure, mass balance in the optical axis direction of the movable body can be improved and thus the movable body can be swung appropriately.

In at least an embodiment of the present invention, it may be structured that the support mechanism includes a gimbal mechanism structured between the movable body and the fixed body and a plate-shaped spring whose one end part is connected with the movable body and the other end part is fixed to the fixed body. According to this structure, the movable body can be swingably supported by the gimbal mechanism appropriately and, in a state that the drive mechanism is not operated, a tilt of the movable body can be restrained by the plate-shaped spring.

In at least an embodiment of the present invention, it may be structured that the fixed body includes a cover in a frame shape and a frame in a frame shape which is connected with the cover on the one side in the optical axis direction and holds the other end part of the plate-shaped spring together with the cover, and the opened end is structured by using the frame. According to this structure, an end part of the plate-shaped spring is easily and surely held between the cover and the frame structuring the opened end.

In at least an embodiment of the present invention, it may be structured that the cover and the frame are made of metal material, and a welded mark formed when the cover and the frame are connected with each other by welding is left between the cover and the frame. According to this structure, in comparison with adhesion or the like, the cover and the frame can be connected with each other surely and efficiently.

In at least an embodiment of the present invention, it may be structured that the fixed body includes a case made of metal which covers the cover from an outer side, the case is provided with a cut-out part, the cover is provided with a protruded part which is fitted into the cut-out part without protruding from an outer face of the case, and the welded mark formed when the cover and the frame are connected with each other by welding is left between an inner face of the cut-out part and the protruded part. According to this structure, the case and the cover can be positioned through the cut-out part and the protruded part. Further, the cover and the case can be surely and efficiently connected with each other in comparison with adhesion or the like. In addition, a welded mark is left in the cut-out part and thus the welded mark is restrained from projecting to an outer side from the case.

Further, according to at least an embodiment of the present invention, there may be provided a manufacturing method for an optical unit with a shake correction function including a movable body having a holder which holds an optical module on its inner side, a fixed body which swingably supports the movable body through a support mechanism, and a shake correction drive mechanism structured to swing the movable body. The manufacturing method includes previously structuring an end part on one side in an optical axis direction of the fixed body as an opened end, supporting the holder by the fixed body through the support mechanism before the optical module is held by the holder, attaching the optical module to an inner side of the holder through the opened end, and structuring a swing restriction part by using the opened end with which a protruded part of the movable body protruded through the opened end to the one side in the optical axis direction is abutted when the movable body is swung and thereby a swing range of the movable body is restricted.

In the manufacturing method for an optical unit with a shake correction function in accordance with at least an embodiment of the present invention, an end part on one side in an optical axis direction of a fixed body is structured to be an opened end and the fixed body includes no bottom plate for covering a movable body on the one side in the optical axis direction. Therefore, a dimension in the optical axis direction of an optical unit with a shake correction function can be reduced. Further, a bottom plate is not provided and thus, a holder is mounted on an inner side of the fixed body and, after that, an optical module can be mounted on an inner side of the holder through the opened end of the fixed body. Therefore, an optical unit with a shake correction function can be manufactured efficiently. Further, a swing restriction part structured to restrict a swing range of the movable body is provided at the opened end of the fixed body and thus an excessive swing of the movable body can be prevented. Therefore, damages of the movable body, the fixed body and the support mechanism due to an excessive swing of the movable body can be restrained.

In at least an embodiment of the present invention, it is preferable that, in order to provide a stopper member as the protruded part which is to be connected with an end part on the one side in the optical axis direction of the holder, a plurality of kinds of stopper members having different masses is previously prepared, and a stopper member among the plurality of kinds of the stopper members which is capable of improving mass balance in the optical axis direction of the movable body is connected with the holder. According to this method, mass balance in the optical axis direction of the movable body can be improved and thus the movable body can be swung appropriately.

In at least an embodiment of the present invention, it is preferable that the support mechanism includes a gimbal mechanism structured between the movable body and the fixed body and a plate-shaped spring whose one end part is connected with the movable body and the other end part is fixed to the fixed body, the fixed body includes a cover in a frame shape and a frame in a frame shape which is connected with the cover on the one side in the optical axis direction and holds the other end part of the plate-shaped spring together with the cover, and the cover and the frame is manufactured by a metal injection method in which a molding body made by injecting metal powder and a binder to a die is sintered. According to a metal injection method, the cover and the frame can be manufactured efficiently even when their shapes are complicated. Therefore, a portion corresponding to the cover and a portion corresponding to the frame in the fixed body can be respectively easily structured in shapes corresponding to their functions.

In at least an embodiment of the present invention, it is preferable that the one side in the optical axis direction is an image side in the optical axis direction, the support mechanism includes a gimbal mechanism structured between the movable body and the fixed body and a plate-shaped spring whose one end part is connected with the movable body and the other end part is fixed to the fixed body, the fixed body includes a cover in a frame shape and a frame in a frame shape which is connected with the cover on the one side in the optical axis direction and holds the other end part of the plate-shaped spring together with the cover, the frame structures the opened end, the cover and the frame are made of metal material, and the cover and the frame are connected with each other by welding. According to this method, the cover and the case can be surely and efficiently connected with each other in comparison with adhesion or the like.

In at least an embodiment of the present invention, it is preferable that the fixed body includes a case made of metal which covers the cover from an outer side, the case is provided with a cut-out part, the cover is provided with a protruded part which is fitted to the cut-out part without protruding from an outer face of the case, and an inner face of the cut-out part and the protruded part are connected with each other by welding the case with the cover. According to this method, the case and the cover can be positioned by the cut-out part and the protruded part. In addition, a welded mark is left in the cut-out part and thus the welded mark is restrained from projecting to an outer side from the case.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An optical unit 1 with a shake correction function to which the present invention is applied will be described below with reference to the accompanying drawings. In the following descriptions, three axes of "X", "Y" and "Z" are directions perpendicular to each other. One side in the "X"-axis direction is indicated as "+X", the other side is indicated as "−X", one side in the "Y"-axis direction is indicated as "+Y", the other side is indicated as "−Y", one side in the "Z"-axis direction is indicated as "+Z", and the other side is indicated as "−Z". The "Z"-axis direction is a center axial line "L" of the optical unit 1 with a shake correction function. The center axial line "L" direction is an optical axis direction of an optical module 2 which is mounted on the optical unit 1 with a shake correction function. The "−Z" direction is a direction directing to an image side in the optical axis direction, and the "+Z" direction is a direction directing to an object side in the optical axis direction. "One side in the optical axis direction" corresponds to the other side in the "Z" direction ("−Z" direction side) along which the center axial line "L" is extended, and "the other side in the optical axis direction" corresponds to one side in the "Z" direction ("+Z" direction side) along which the center axial line "L" is extended. A turning around the "X"-axis of the optical unit 1 with a shake correction function corresponds to a so-called pitching (vertical swing) and a turning around the "Y"-axis corresponds to a so-called yawing (lateral swing). Further, a turning around the "Z"-axis corresponds to a so-called rolling.

(Entire Structure)

Figure 1:
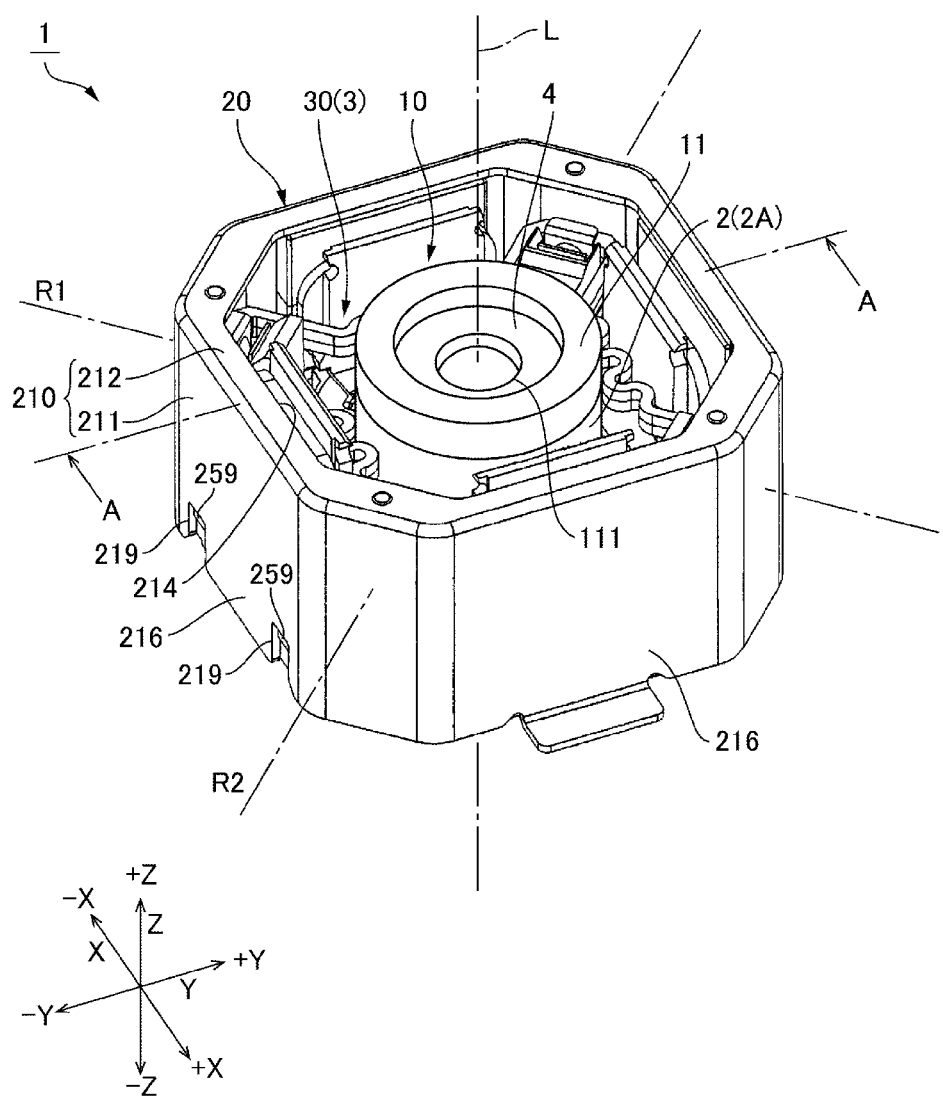
FIG. 1 is a perspective view showing an optical unit with a shake correction function in accordance with an embodiment of the present invention.
Figure 2:
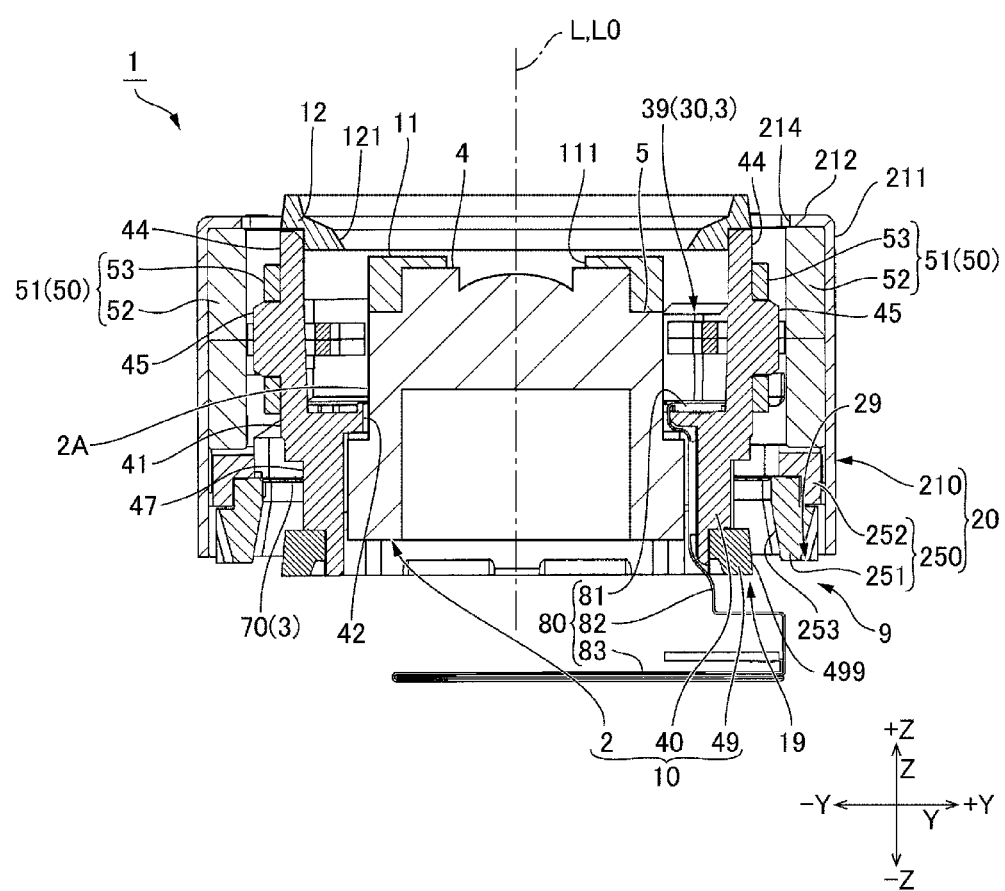
FIG. 2 is a cross-sectional view showing an optical unit with a shake correction function in accordance with an embodiment of the present invention.

FIG. 1 is a perspective view showing an optical unit 1 with a shake correction function in accordance with an embodiment of the present invention. FIG. 2 is a cross-sectional view ("A-A" cross-sectional view in FIG. 1) showing an optical unit 1 with a shake correction function in accordance with an embodiment of the present invention. In FIG. 1, a second weight 12 is not shown so that an internal state is easily understood.

An optical unit 1 with a shake correction function shown in FIGS. 1 and 2 is mounted with an optical module 2. The optical unit 1 with a shake correction function is used in an optical device such as a cell phone with a camera and a drive recorder or in an optical device such as an action camera mounted on a helmet, a bicycle, a radio-controlled helicopter and the like or a wearable camera. In the optical device, when a shake is occurred at the time of photographing, in order to prevent disturbance of a photographed image, the optical unit 1 with a shake correction function is driven to correct the shake.

Figure 3:
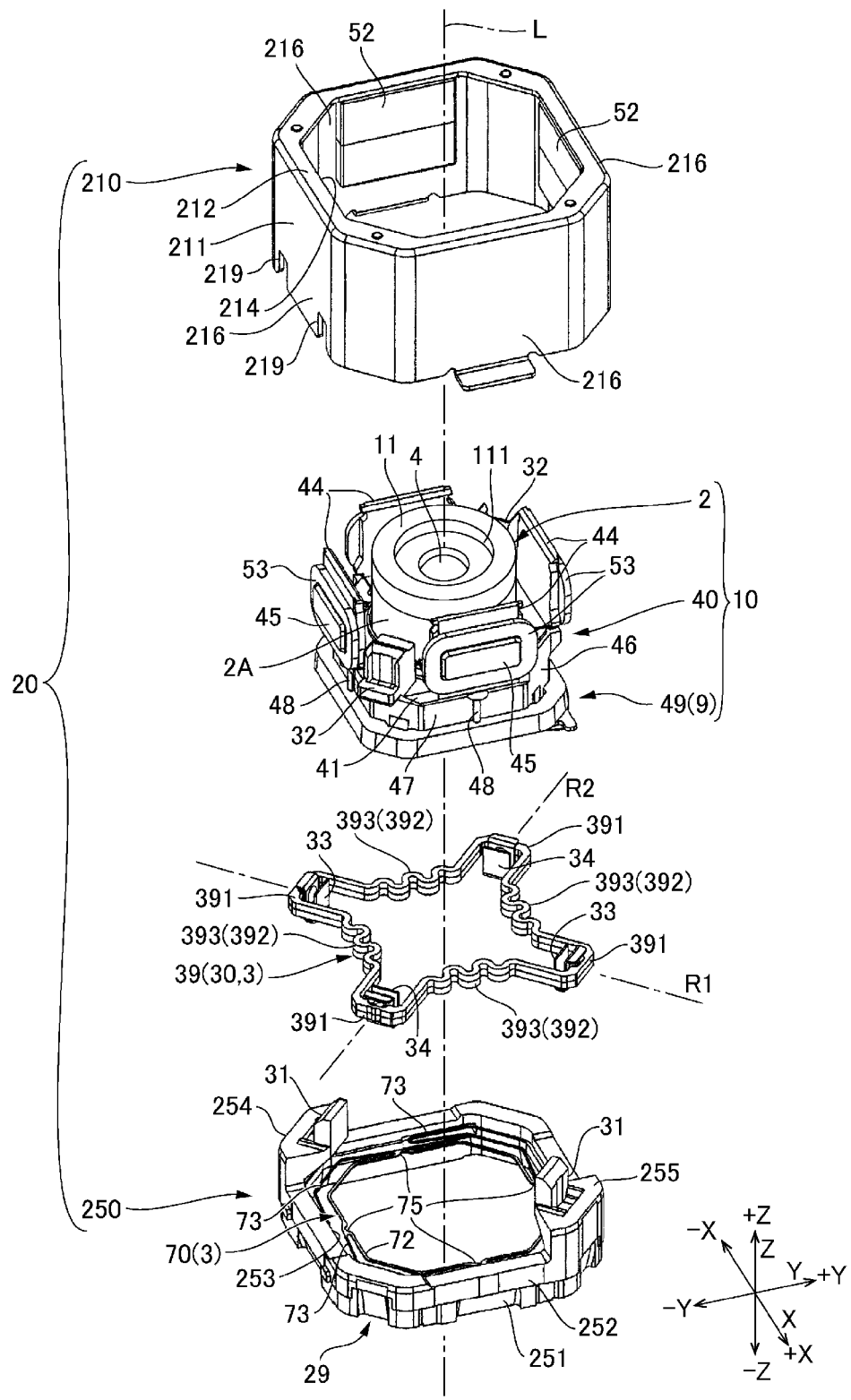
FIG. 3 is an exploded perspective view showing an optical unit with a shake correction function in accordance with an embodiment of the present invention.

FIG. 3 is an exploded perspective view showing the optical unit 1 with a shake correction function in accordance with an embodiment of the present invention. In FIG. 3, a second weight 12 is not shown so that an internal state is easily understood. As shown in FIGS. 2 and 3, the optical unit 1 with a shake correction function includes a movable body 10, a fixed body 20, a support mechanism 3 structured to swingably support the movable body 10 with respect to the fixed body 20, and a shake correction drive mechanism 50 structured to generate a magnetic-drive force for relatively displacing the movable body 10 with respect to the fixed body 20. The support mechanism 3 includes a gimbal mechanism 30 and a plate-shaped spring 70 which connects the movable body 10 with the fixed body 20. Further, the optical unit 1 with a shake correction function 1 includes a flexible circuit board 80. The optical unit 1 is electrically connected through the flexible circuit board 80 with a host control device provided on a main body side of an optical device on which the optical unit 1 with a shake correction function is mounted. The control device is inputted with an output of a gyroscope (shake detection sensor) configured to detect a shake when the shake is generated in the optical device. The control device drives the shake correction drive mechanism 50 based on an output of the gyroscope and swings the movable body 10 to perform a shake correction.

The movable body 10 is swingably supported around the first axial line "R1" (see FIG. 1) intersecting the center axial line "L" and is swingably supported around the second axial line "R2" (see FIG. 1) which intersects the center axial line "L" and the first axial line "R1" by the gimbal mechanism 30. The first axial line "R1" and the second axial line "R2" are diagonal directions of the fixed body 20 and are perpendicular to the center axial line "L". Further, the first axial line "R1" and the second axial line "R2" are perpendicular to each other.

(Structure of Fixed Body 20)

Figure 4A:
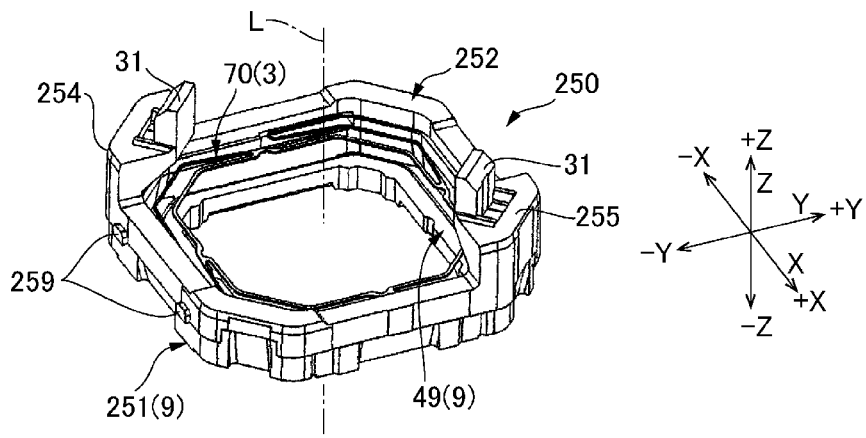
FIGS. 4A and 4B are explanatory views showing a cover, a frame and the like which are used in a fixed body of an optical unit with a shake correction function in accordance with an embodiment of the present invention.
Figure 4B:
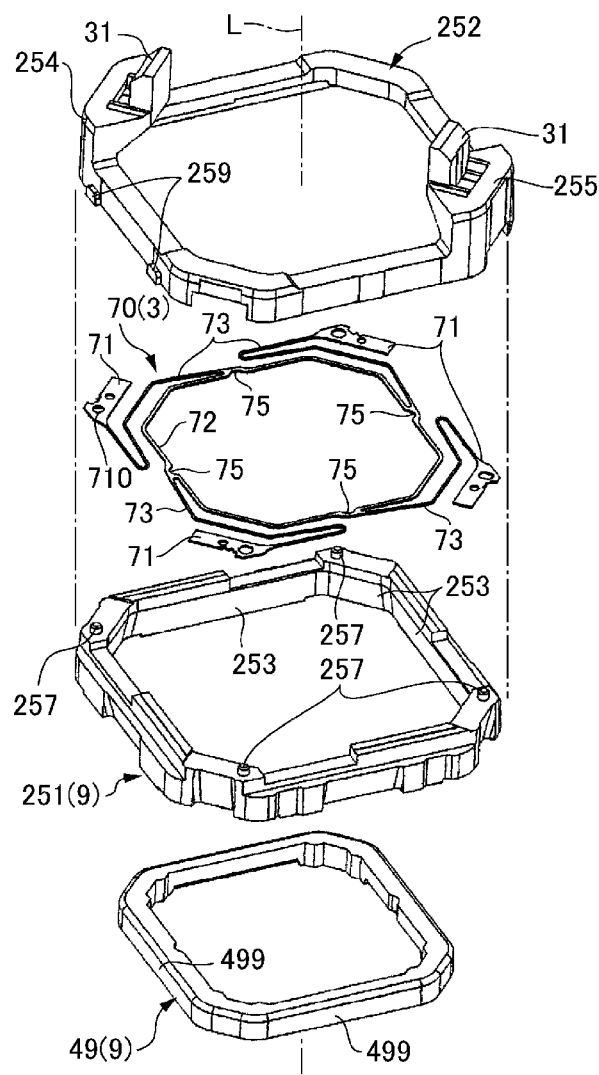

FIGS. 4A and 4B are explanatory views showing a cover 252, a frame 251 and the like which are used in the fixed body 20 of the optical unit 1 with a shake correction function in accordance with an embodiment of the present invention. FIG. 4A is a perspective view showing a state that a cover 252 and a frame 251 are connected with each other and FIG. 4B is an exploded perspective view showing a state that the cover 252 and the frame 251 are separated from each other. In FIGS. 4A and 4B, a plate-shaped spring 70 and a stopper member 49 are also shown.

As shown in FIGS. 2 and 3, the fixed body 20 includes a first case 210 whose outward shape is a substantially square when viewed in the "Z"-axis direction and a second case 250 which is attached to the first case 210 from the "−Z" direction side. The first case 210 and the second case 250 are fixed to each other by welding or the like. The first case 210 is provided with a body part 211 in a rectangular tube shape which surrounds the movable body 10 and an end plate part 212 in a rectangular frame shape which is projected to an inner side from an end part in the "+Z" direction of the body part 211. A window 214 is formed at a center of the end plate part 212. The body part 211 is provided with side plate parts 216 which are located in respective directions of the "+X" direction side, the "−X" direction side, the "+Y" direction side and the "−Y" direction side.

As shown in FIGS. 2, 3, 4A and 4B, the second case 250 is structured of a cover 252 in a rectangular frame shape and a frame 251 in a rectangular frame shape which is attached to the cover 252 on the "−Z" direction side. The fixed body side connection parts 71 (the other end part) of the plate-shaped spring 70 are held between the cover 252 and the frame 251, and the movable body side connection part 72 (one end part) of the plate-shaped spring 70 is held by the movable body 10.

More specifically, as shown in FIGS. 4A and 4B, the fixed body side connection part 71 of the plate-shaped spring 70 is formed with a hole 710, and a corner portion of the frame 251 on which the fixed body side connection part 71 of the plate-shaped spring 70 is overlapped is formed with a protruded part 257 which is fitted into the hole 710. Therefore, in a state that the protruded parts 257 of the frame 251 are fitted into the holes 710 of the fixed body side connection parts 71 of the plate-shaped spring 70 and the plate-shaped spring 70 is positioned, when the cover 252 and the frame 251 are connected with each other, the fixed body side connection parts 71 of the plate-shaped spring 70 are held between the cover 252 and the frame 251.

The cover 252 and the frame 251 are made of metal material and are connected with each other by welding. For example, the cover 252 and the frame 251 are connected with each other by welding at a plurality of positions in a circumferential direction. Therefore, welded marks (not shown) formed when the cover 252 and the frame 251 are connected each other by welding are left between the cover 252 and the frame 251. According to this structure, in comparison with adhesion or the like, the cover 252 and the frame 251 can be connected with each other surely and efficiently.

The cover 252 is provided with side wall parts 254 and 255 which are stood up to the "+Z" direction from diagonal positions on the first axial line "R1". Each of the side wall parts 254 and 255 is formed with a first contact point spring holding part 31 which structures a first swing support part 36 of the gimbal mechanism 30 described below.

In FIG. 3, the first case 210 is, similarly to the second case 250, also made of metal material and thus, the first case 210 and the cover 252 of the second case 250 are fixed to each other by welding. In this embodiment, as shown in FIGS. 1 and 3, in the body part 211 of the first case 210, end parts to the "−Z" direction of the side plate parts 216 located on the "+Y" direction side and the "−Y" direction side are formed with two cut-out parts 219 and, as shown in FIGS. 1, 3, 4A and 4B, an outer side face of the cover 252 is formed with protruded parts 259 which are fitted to the cut-out parts 219. Therefore, in this embodiment, inner faces of the cut-out parts 219 and the protruded parts 259 are welded and thereby the first case 210 and the cover 252 of the second case 250 are fixed to each other.

Therefore, a welded mark (not shown) formed when the first case 210 and the cover 252 are welded is left between the inner face of the cut-out part 219 and the protruded part 259. In this embodiment, a protruding dimension of the protruded part 259 is smaller than a thickness dimension of the side plate part 216 and thus the protruded part 259 is not protruded from the side plate part 216 to an outer side. Therefore, a welded mark is left within the cut-out part 219 and thus the welded mark is prevented from projecting to an outer side from the first case 210.

The fixed body 20 structured as described above is not provided with a bottom plate at an end part in the "−Z" direction (image side in the optical axis direction) and thus, its end part in the "−Z" direction is formed to be an opened end 29 (see FIG. 2). The opened end 29 is structured by the frame 251.

An inner wall of the frame 251 is, as described below, a swing restriction part 253 of the stopper mechanism 9 which restricts a swing range of the movable body 10. In other words, the swing restriction part 253 is structured at the opened end 29 on the image side in the optical axis direction of the fixed body 20. In this embodiment, the swing restriction part 253 is formed to be an inclined face which is obliquely inclined with respect to the optical axis direction (center axial line "L").

(Shake Correction Drive Mechanism)

Figure 5A:
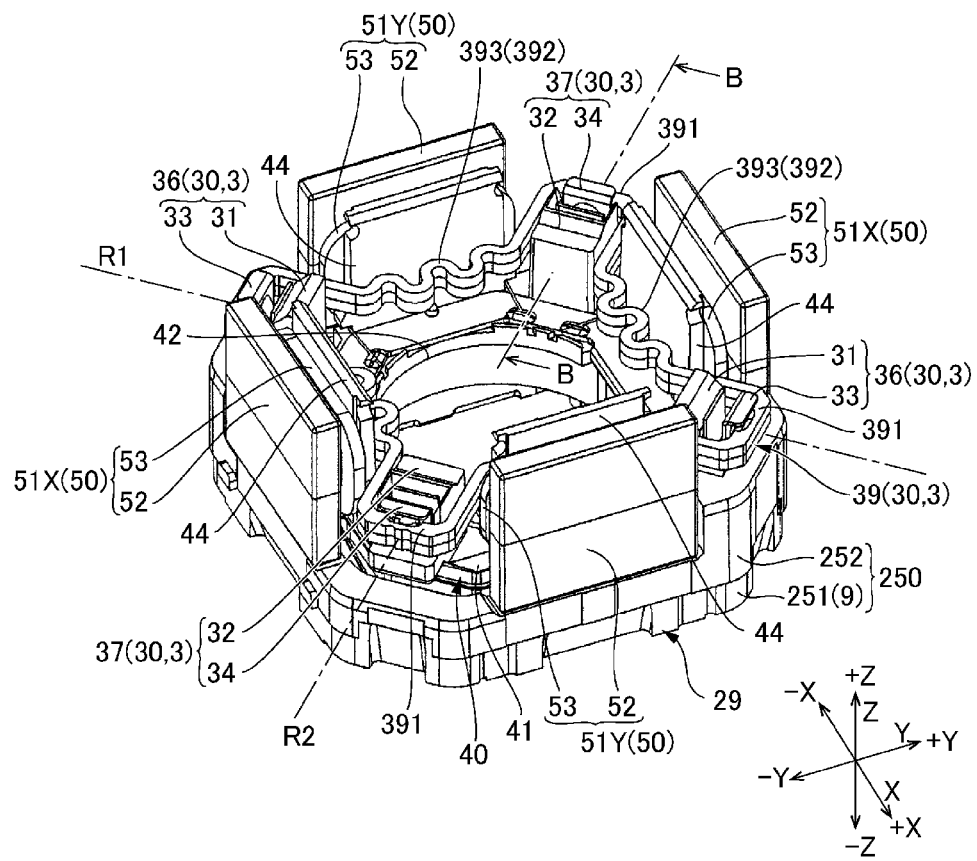
FIGS. 5A and 5B are explanatory views showing a gimbal mechanism and a shake correction drive mechanism in an optical unit with a shake correction function in accordance with an embodiment of the present invention.
Figure 5B:
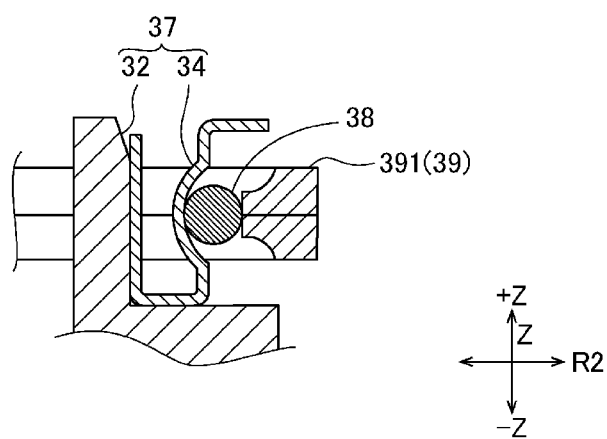

FIGS. 5A and 5B are explanatory views showing the gimbal mechanism 30 and a shake correction drive mechanism 50 in the optical unit 1 with a shake correction function in accordance with an embodiment of the present invention. FIG. 5A is a perspective view showing a state that the first case 210 and the optical module 2 are detached from the optical unit 1 with a shake correction function and FIG. 5B is a cross-sectional view showing a second swing support part 37 ("B-B" cross-sectional view in FIG. 5A).

As shown in FIGS. 2, 3, 5A and 5B, the shake correction drive mechanism 50 includes four magnetic drive mechanisms 51 provided between the fixed body 20 and the movable body 10. Each of the magnetic drive mechanisms 51 includes a magnet 52 and a coil 53. The coil 53 is an air-core coil. The coil 53 is held by side faces on the "+X" direction side and the "−X" direction side, and side faces on the "+Y" direction side and the "−Y" direction side of the movable body 10. The magnet 52 is held by inner faces of side plate parts 216 of the body part 211 of the first case 210 which are located on the "+X" direction side, the "−X" direction side, the "+Y" direction side and the "−Y" direction side. Therefore, the magnet 52 and the coil 53 are faced each other between the movable body 10 and the body part 211 of the first case 210 on each of the "+X" direction side, the "−X" direction side, the "+Y" direction side and the "−Y" direction side.

The magnet 52 is magnetized so that a pole of an outer face side contacting with the body part 211 and a pole of an inner face side facing the coil 53 are different from each other. Further, the magnet 52 is divided into two pieces in the center axial line "L" direction (the "Z"-axis direction) and magnetic poles on the inner face side are magnetized so as to be different from each other with the divided position as a boundary. Therefore, the coil 53 is utilized so that its long side portions on the upper and lower sides are effective sides. Magnetized patterns of four magnets are the same as each other on outer face sides and inner face sides. The first case 210 is structured of magnetic material and functions as a yoke for the magnets 52.

As shown in FIG. 5A, the four magnetic drive mechanisms 51 include two first magnetic drive mechanisms 51X comprised of the magnet 52 and the coil 53 located on the "+Y" direction side and the "−Y" direction side of the movable body 10, and two second magnetic drive mechanisms 51Y comprised of the magnet 52 and the coil 53 located on the "+X" direction side and the "−X" direction side of the movable body 10. Two coils 53 structuring the first magnetic drive mechanisms 51X are wired and connected so that magnetic-drive forces are generated in the same direction around the "X"-axis when energized. Further, two coils 53 structuring the second magnetic drive mechanisms 51Y are wired and connected so that magnetic-drive forces are generated in the same direction around the "Y"-axis when energized. Therefore, when an electric current is supplied to the coils 53 of the first magnetic drive mechanisms 51X, turning forces in the same direction around the "X"-axis are applied to the movable body 10 at two positions facing in the "Y"-axis direction interposing the movable body 10. Further, when an electric current is supplied to the coils 53 of the second magnetic drive mechanisms 51Y, turning forces in the same direction around the "Y"-axis are applied to the movable body 10 at two positions facing in the "X"-axis direction interposing the movable body 10. Therefore, a shake correction in a pitching (vertical swing) direction is performed by supplying an electric current to the coils 53 of the first magnetic drive mechanisms 51X. Further, a shake correction in a yawing (lateral swing) direction is performed by supplying an electric current to the coils 53 of the second magnetic drive mechanisms 51Y.

(Structure of Movable Body 10)

Figure 6A:
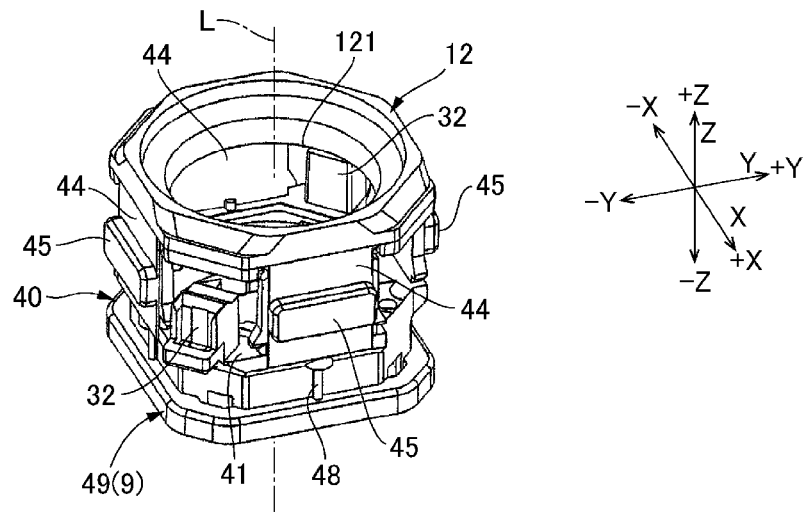
FIGS. 6A and 6B are explanatory views showing a holder and a stopper member which are used in a movable body of an optical unit with a shake correction function in accordance with an embodiment of the present invention.
Figure 6B:
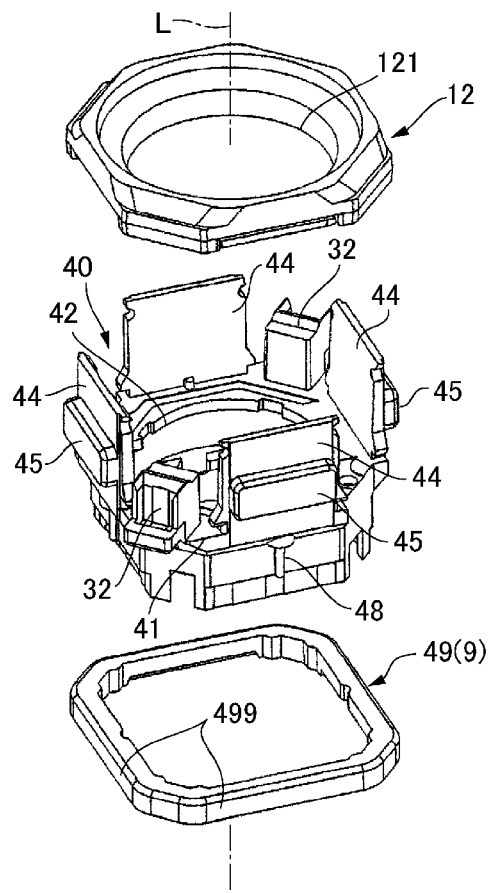

FIGS. 6A and 6B are explanatory views showing a holder 40 and a stopper member 49 which are used in the movable body 10 of the optical unit 1 with a shake correction function in accordance with an embodiment of the present invention. FIG. 6A is a perspective view showing a state that the holder 40 and the stopper member 49 are connected with each other and FIG. 6B is an exploded perspective view showing a state that the holder 40 and the stopper member 49 are separated from each other.

As shown in FIGS. 2 and 3, the movable body 10 includes an optical module 2, a holder 40 which holds the optical module 2 on its inner side, and a first weight 11 which is fixed to an end part on the "+Z" direction side of the optical module 2. The optical module 2 is disposed so that its optical axis direction (center axial line "L" direction) is coincided with the "Z"-axis direction.

As shown in FIG. 2, the optical module 2 includes an upper module 2A in a columnar shape which holds a lens unit as an optical element. A lens holder 4 in a columnar shape is protruded from an end part on the "+Z" direction side of the upper module 2A, and a ring-shaped face 5 directing to the "+Z" direction side is provided on an outer peripheral side of the lens holder 4. The first weight 11 is attached so as to be abutted with the ring-shaped face 5 and to surround an outer peripheral side and the "+Z" direction side of the lens holder 4. The first weight 11 is made of nonmagnetic metal and thus no magnetic attraction force is generated between the first weight 11 and the magnets 52. The first weight 11 is attached for adjusting a gravity center position in the "Z"-axis direction of the movable body 10. The first weight 11 is a ring-shaped member which is structured of one metal plate or a plurality of laminated metal plates and an circular opening 111 is provided in its center.

The holder 40 is provided with a frame part 41 whose planar shape when viewed in the "Z"-axis direction is a substantially square. A circular holding hole 42 (see FIG. 2) for disposing the optical module 2 is formed at a center of the frame part 41. Specifically, the circular holding hole 42 is formed so as to penetrate through in the "Z"-axis direction (optical axis direction) so that, after the holder 40 is supported by the fixed body 20, the optical module 2 can be attached to an inner side of the holder 40 from the opened end 29 side (image side in the optical axis direction). When the optical module 2 is to be fixed to the holder 40, the optical module 2 is abutted with a reference surface not shown provided in the holder 40 in the "Z"-axis direction and is positioned.

As shown in FIG. 3 and FIGS. 6A and 6B, each of side end edges on the "+X" direction side, the "−X" direction side, the "+Y" direction side and the "−Y" direction side of the frame part 41 is provided with a wall part 44 which is stood up in the "+Z" direction. The wall parts 44 are disposed so as to surround an outer peripheral side of the holding hole 42 and are extended in a straight line shape in the "X"-axis direction or the "Y"-axis direction at centers of the respective side end edges of the frame part 41. Each of four wall parts 44 is provided with a coil holding part 45 formed on its outer side face which faces on an opposite side to the holding hole 42. The coil holding part 45 is a rectangular protruded part to which the coil 53 of the magnetic drive mechanism 51 is attached. As shown in FIG. 2, the coil holding part 45 is protruded to a side of the magnet 52 from the center of the coil 53 and faces the magnet 52. When the movable body 10 is largely displaced in the "X"-axis direction or the "Y"-axis direction due to a swing, the coil holding part 45 is abutted with the magnet 52 to restrict a moving range of the movable body 10.

As shown in FIGS. 2, 3, 6A and 6B, a second weight 12 in a frame shape is attached to an end part on the "+Z" direction side of the holder 40 (end parts on the "+Z" direction side of the wall parts 44) so as to surround an end part on the "+Z" direction side of the lens holder 4. An end part on the "+Z" direction side of the second weight 12 is protruded to the "+Z" direction side from the window 214 of the first case 210. The second weight 12 is, similarly to the first weight 11, made of nonmagnetic metal and thus no magnetic attraction force is generated between the second weight 12 and the magnets 52. Further, the second weight 12 is, similarly to the first weight 11, attached for adjusting the gravity center position in the "Z"-axis direction of the movable body 10. A circular opening 121 is provided at the center of the second weight 12. In accordance with an embodiment of the present invention, the first weight 11 and the second weight 12 may be made of material other than metal.

A cut-out part 46 which is cut out so as to be a perpendicular face with respect to the first axial line "R1" is provided at diagonal positions on the first axial line "R1" of the frame part 41. When the movable body 10 is assembled to the fixed body 20, the side wall parts 254 and 255 provided at the diagonal positions on the first axial line "R1" of the second case 250 are located at the cut-out parts 46. Therefore, the first contact point spring holding parts 31 provided in the side wall parts 254 and 255 are disposed at the diagonal positions on the first axial line "R1" of the frame part 41 (see FIG. 5A). Further, second contact point spring holding parts 32 structuring the second swing support parts 37 of the support mechanism 30 are formed at diagonal positions on the second axial line "R2" of the frame part 41.

An outer peripheral face of the frame part 41 is formed in a step shape at a midway position in the "Z"-axis direction on each of the faces on the "+X" direction side, the "−X" direction side, the "+Y" direction side, and the "−Y" direction side. In other words, as shown in FIGS. 2 and 3, a step part 47 which is recessed to an inner peripheral side is provided on a portion on the "−Z" direction side of the outer peripheral face of the frame part 41. A stopper member 49 is attached to an outer peripheral face of an end part in the "−Z" direction (image side in the optical axis direction) of the step part 47. The step part 47 is provided with fixing protruded parts 48 which are formed at centers of respective faces which face on the "+X" direction side, the "−X" direction side, the "+Y" direction side and the "−Y" direction side. The fixing protruded part 48 is extended in a straight line shape in the "Z"-axis direction and functions as an engaging part with which an elastic support member 70 is engaged.

As shown in FIG. 2, a flexible circuit board 80 for power feeding to the coils 53 is attached to the frame part 41. The flexible circuit board 80 is provided with a rectangular frame portion 81 which is extended along an inner peripheral side of four wall parts 44, a leading-around part 82 in a strip shape which is extended in the "−Z" direction from an inner peripheral edge of the rectangular frame portion 81 through the holding hole 42, and a flat plate-shaped portion 83 provided at an end part in the "−Z" direction of the leading-around part 82. Four coils 53 are connected with the rectangular frame portion 81. The flat plate-shaped portion 83 is located on the "−Z" direction side with respect to the opened end 29 of the second case 250 and is connected with an electronic component provided in the optical module 2.

(Structure of Stopper Mechanism 9)

As shown in FIGS. 2, 3, 6A and 6B, the stopper member 49 in a frame shape is connected with an outer peripheral face of an end part in the "−Z" direction of the holder 40 of the movable body 10 by adhesion or the like. The stopper member 49 structures a protruded part 19 of the movable body 10 which is protruded in the "−Z" direction from the opened end 29 of the fixed body 20. The stopper member 49 (protruded part 19) structures the stopper mechanism 9 which is structured to abut with the swing restriction part 253 provided at the opened end 29 of the fixed body 20 and restrict a swing range of the movable body 10 when the movable body 10 is swung.

In this embodiment, both of the holder 40 and the stopper member 49 are made of resin but the hardness of the stopper member 49 is lower than that of the holder 40. In other words, the stopper member 49 is made of soft material or elastically deformable material. Therefore, an impact can be made small when the stopper member 49 and the swing restriction part 253 are contacted with each other. Further, an abutting noise can be made small when the stopper member 49 and the swing restriction part 253 are abutted with each other.

The swing restriction part 253 is formed to be an inclined face which is obliquely inclined with respect to the optical axis direction (center axial line "L") and thus a side face 499 of the stopper member 49 and the swing restriction part 253 are abutted so as to be surface-contacted with each other. Therefore, an abutting noise when the stopper member 49 and the swing restriction part 253 are contacted with each other can be made small. Further, when the stopper member 49 and the swing restriction part 253 are contacted with each other, the stopper member 49 can be restrained from being damaged.

The above-mentioned structure can be realized by appropriately setting angles of the side face 499 of the stopper member 49 and the swing restriction part 253 with respect to the optical axis direction (center axial line "L") according to distances from the swing center of the movable body 10 to the side face 499 of the stopper member 49 and the swing restriction part 253. In other words, the side face 499 of the stopper member 49 and the inclined face of the swing restriction part 253 are set in angles substantially surface-contacted with each other when the movable body 10 is swung.

(Structure of Gimbal Mechanism 30)

The gimbal mechanism 30 which swingably supports the movable body 10 with respect to the fixed body 20 is structured between the second case 250 and the holder 40. The gimbal mechanism 30 includes, when the movable body 10 is assembled to the fixed body 20, the first swing support parts 36 which are disposed at two positions separated from each other in the first axial line "R1" direction, the second swing support parts 37 which are disposed at two positions separated from each other in the second axial line "R2" direction, and a movable frame 39 which is supported by the first swing support parts 36 and the second swing support parts 37.

As shown in FIGS. 3 and 5A, the movable frame 39 is a roughly rectangular gimbal spring. The movable frame 39 is provided with supporting point parts 391 which are provided at four positions around the center axial line "L", and connecting parts 392 which connect adjacent supporting point parts 391 with each other around the center axial line "L". A metal spherical body 38 (see FIG. 5B) is fixed on an inner side face of each of the supporting point parts 391 by welding or the like. A convex surface in a hemispheric shape which faces the center of the movable frame 39 is provided by the spherical body 38 at each of the supporting point parts 391. The connecting part 392 is provided with a meandering part 393 extended in the "X"-axis direction or the "Y"-axis direction and is elastically deformable in a direction perpendicular to the center axial line "L".

The first swing support part 36 includes the first contact point spring holding part 31 provided in the second case 250 of the fixed body 20 and a first contact point spring 33 which is held by the first contact point spring holding part 31. The first contact point spring 33 is a metal plate spring which is bent in a "U"-shape. The first swing support parts 36 are disposed on inner sides of the supporting point parts 391 provided at diagonal positions in the first axial line "R1" direction and support the movable frame 39 through the first contact point springs 33 attached in an elastically deformable state in the first axial line "R1" direction.

The second swing support part 37 includes the second contact point spring holding part 32 provided in the holder 40 of the movable body 10, and a second contact point spring 34 which is held by the second contact point spring holding part 32. The second contact point spring 34 is a metal plate spring which is bent in a "U"-shape and has the same shape as the first contact point spring 33. The second swing support parts 37 support the movable frame 39 through the second contact point springs 34 which are attached in an elastically deformable state in the second axial line "R2" direction.

The first contact point spring 33 of the first swing support part 36 and the second contact point spring 34 of the second swing support part 37 are respectively formed with a contact point part in a hemispheric shape which is contacted with the spherical body 38 (see FIG. 5B) welded to the supporting point part 391. The supporting point parts 391 of the movable frame 39 provided at four positions around the center axial line "L" are supported so that the hemispheric contact point parts of the first contact point spring 33 and the second contact point spring 34 and the spherical bodies 38 are point-contacted with each other and, in this manner, the movable frame 39 is supported. Therefore, the movable frame 39 is supported in a turnable state in each of two directions perpendicular to the center axial line "L" direction (first axial line "R1" direction and second axial line "R2" direction).

(Structure of Plate-shaped Spring 70)

A plate-shaped spring 70 is, as shown in FIGS. 2 and 3, disposed on a side to the "−Z" direction with respect to the gimbal mechanism 30 and connects the fixed body 20 with the movable body 10. An attitude of the movable body 10 in a stationary state that the shake correction drive mechanism 50 is not driven is determined by the plate-shaped spring 70.

As shown in FIG. 4B, the plate-shaped spring 70 is a spring member in a rectangular frame shape which is structured by processing a metal plate. The plate-shaped spring 70 is connected with the fixed body 20 so that the fixed body side connection parts 71 provided on its outer peripheral part are fixed between the cover 252 and the frame 251 of the second case 250. Further, a movable body side connection part 72 in a frame shape is provided on an inner peripheral part of the plate-shaped spring 70. The movable body side connection part 72 is connected with the fixed body side connection parts 71 through arm parts 73. When the movable body 10 is assembled to the fixed body 20, the recessed parts 75 provided in the movable body side connection part 72 and the protruded parts 48 provided on the outer peripheral face of the movable body 10 are engaged with each other. The plate-shaped spring 70 and the movable body 10 are connected with each other by fixing the engagement portions with an adhesive.

(Manufacturing Method)

In a manufacturing method for an optical unit 1 with a shake correction function in this embodiment, for example, before an optical module 2 is held by the holder 40, the holder 40 is supported by the fixed body 20 through the support mechanism 3 and, after that, the optical module 2 is attached to an inner side of the holder 40 through the opened end 29 which is the image side in the optical axis direction of the fixed body 20. As a result, the swing restriction part 253 is structured by the opened end 29 so that the protruded part 19 of the movable body 10 protruded from the opened end 29 to one side in the optical axis direction (side in the "Z" direction) is abutted with the swing restriction part 253 to restrict a swing range of the movable body 10 when the movable body 10 is swung.

Further, it is preferable that a plurality of kinds of stopper members 49 whose mass, shape and/or material are different from each other has been prepared as the stopper member 49 and, among a plurality of kinds of the stopper members 49, for example, a stopper member 49 by which mass balance in the optical axis direction of the movable body 10 (center axial line "L" direction) can be improved is connected with the holder 40. According to this method, mass balance in the optical axis direction (center axial line "L" direction) of the movable body 10 can be improved by using a stopper member 49 having an appropriate mass judging from the balance with the mass of the first weight 11 and the second weight 12. In other words, the stopper member 49 is attached to an end part of the frame part 41 of the holder 40 in the "−Z" direction (image side in the optical axis direction). Therefore, mass balance can be improved with respect to the second weight 12 provided at an end part on the "+Z" direction side (object side in the optical axis direction) of the holder 40 and to the first weight 11 fixed to an end part on the "+Z" direction side of the optical module 2.

Further, it is preferable that the cover 252 and the frame 251 are manufactured by a metal injection method in which a molding body made by injecting metal powder and binder to a die is sintered. According to this method, the cover 252 and the frame 251 can be manufactured efficiently even when their shapes are complicated. Therefore, a portion corresponding to the cover 252 and a portion corresponding to the frame 251 in the fixed body 20 can be respectively easily structured in shapes corresponding to their functions.

(Principal Effects in this Embodiment)

As described above, in the optical unit 1 with a shake correction function in this embodiment, the end part on one side (end part on the "−Z" direction side) in the optical axis direction (center axial line "L" direction) of the fixed body 20 is structured to be an opened end, and the fixed body 20 is provided with no bottom plate which covers the movable body 10 on the one side in the optical axis direction. Therefore, a dimension in the optical axis direction of the optical unit 1 with a shake correction function can be reduced. Further, a bottom plate is not provided and thus, after the holder 40 is mounted on an inner side of the fixed body 20, the optical module 2 can be mounted on an inner side of the holder 40 through the opened end 29 of the fixed body 20. Therefore, the optical unit 1 with a shake correction function can be manufactured efficiently.

Further, the movable body 10 is structured with the protruded part 19 which is protruded from the opened end 29, and the opened end 29 of the fixed body 20 is provided with the swing restriction part 253 configured to abut with the protruded part 19 to restrict a swing range of the movable body 10 when the movable body 10 is swung. Therefore, an excessive swing of the movable body 10 can be prevented. Accordingly, damages of the movable body 10, the fixed body 20 and the support mechanism 3 due to an excessive swing of the movable body 10 can be restrained. Especially, in this embodiment, the plate-shaped spring 70 is used in the support mechanism 3 and the plate-shaped spring 70 is plastically deformed when largely deformed. However, in this embodiment, an excessive swing of the movable body 10 can be prevented and thus the plate-shaped spring 70 is hard to be plastically deformed.

The movable body 10 is provided with the stopper member 49 which is connected with an end part of the holder 40, and the stopper member 49 structures the protruded part 19.

Therefore, the holder 40 and the stopper member 49 are respectively manufactured in appropriate structures corresponding to their functions. For example, the holder 40 holds the optical module 2 on its inner side and is structured to be a connected portion with the support mechanism 3 and thus the holder 40 is capable of using material having high rigidity. On the other hand, the stopper member 49 is capable of using material having low hardness in order to reduce an impact when the stopper member 49 is contacted with the swing restriction part 253.

The fixed body 20 includes the cover 252 in a frame shape and the frame 251 connected with the cover 252. Therefore, the fixed body side connection parts 71 of the plate-shaped spring 70 can be easily and surely held by the fixed body 20 between the cover 252 and the frame 251. Further, the cover 252 and the frame 251 are made of metal material. Therefore, the cover 252 and the frame 251 can be connected with each other by welding and thus, in comparison with adhesion, the cover 252 and the frame 251 can be connected surely and efficiently.

The swing restriction part 253 is formed to be an inclined face which is obliquely inclined with respect to the center axial line "L" direction (optical axis "L" direction) and is configured to be capable of surface-contacting with the side face of the protruded part 19 (side face 499 of the stopper member 49). Therefore, the side face of the protruded part 19 and the swing restriction part 253 are substantially surface-contacted with each other and thus damages of the protruded part 19 and the swing restriction part 253 can be restrained.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
    a movable body comprising a holder which holds an optical module on its inner side;
    a fixed body which swingably supports the movable body through a support mechanism, the support mechanism that swingably supporting the movable body around a first axial line intersecting an optical axis direction and swingably supporting the movable body around a second axial line intersecting the optical axis direction and the first axial line; and
    a shake correction drive mechanism structured to swing the movable body;
    wherein an end part, on one side in an optical axis direction, of the fixed body is structured to be an opened end;
    wherein the movable body comprises a protruded part which is protruded to the one side in the optical axis direction through the opened end; wherein the fixed body comprises a swing restriction part at the opened end which restrict a swing range of the movable body;
    wherein the swing restriction part faces the protruded part and is configured to abut with the protruded part when the movable body is swung;
    wherein the one side in the optical axis direction is an image side in the optical axis direction;
    wherein the movable body comprises a stopper member connected with an end part, on the one side in the optical axis direction, of the holder, and the stopper member structures the protruded part; and
    wherein the swing restriction part is formed to be an inclined face which is obliquely inclined with respect to the optical axis direction and is structured to surface-contact with a side face of the protruded part when the movable body is swung.

2. The optical unit with a shake correction function according to claim 1, wherein hardness of the stopper member is lower than that of the holder.

3. The optical unit with a shake correction function according to claim 1, further comprising a weight which is connected with at least one of an end part, on the other side in the optical axis direction, of the optical module and an end part, on the other side in the optical axis direction, of the holder.

4. The optical unit with a shake correction function according to claim 1, wherein
    the holder comprises a frame part whose planar shape when viewed in the optical axis direction is a substantially square shape,
    the stopper member is formed in a frame shape so as to correspond to an outside shape of the frame part, and
    the swing restriction part disposed at the opened end of the fixed body is disposed so as to surround the stopper member in the frame shape.

5. The optical unit with a shake correction function according to claim 4, wherein hardness of the stopper member is lower than that of the holder.

6. The optical unit with a shake correction function according to claim 4, further comprising a weight which is connected with at least one of an end part, on the other side in the optical axis direction, of the optical module and an end part, on the other side in the optical axis direction, of the holder.

7. The optical unit with a shake correction function according to claim 1, wherein the support mechanism comprises a gimbal mechanism structured between the movable body and the fixed body and a plate-shaped spring whose one end part is connected with the movable body and the other end part is fixed to the fixed body.

8. The optical unit with a shake correction function according to claim 7, wherein
    the fixed body comprises a cover in a frame shape and a frame in a frame shape which is connected with the cover on the one side in the optical axis direction and holds the other end part of the plate-shaped spring together with the cover, and
    the opened end is structured by using the frame.

9. The optical unit with a shake correction function according to claim 8, wherein
    the cover and the frame are made of metal material, and
    a welded mark formed when the cover and the frame are connected with each other by welding is left between the cover and the frame.

10. The optical unit with a shake correction function according to claim 9, wherein
    the fixed body comprises a case made of metal which covers the cover from an outer side,
    the case is provided with a cut-out part,
    the cover is provided with a protruded part which is fitted to the cut-out part without protruding from an outer face of the case, and the welded mark formed when the cover and the frame are connected with each other by welding is left between an inner face of the cut-out part and the protruded part.

11. The optical unit with a shake correction function according to claim 8, wherein
the holder comprises a frame part whose planar shape when viewed in the optical axis direction is a substantially square shape,
the stopper member is formed in a frame shape so as to be correspond to an outside shape of the frame part,
the frame disposed at the opened end of the fixed body is disposed so as to surround the stopper member in the frame shape, and
an inner wall of the frame is formed as the swing restriction part.

12. The optical unit with a shake correction function according to claim 11, wherein
the fixed body comprises a case which covers the cover from an outer side,
the case is provided with a body part whose outward shape when viewed in the optical axis direction is a substantially square shape,
a wall part is disposed at each of side end edges of the frame part which is the substantially square shape,
a coil structuring the shake correction drive mechanism is attached to the wall part, and
a magnet structuring the shake correction drive mechanism is held on an inner face of the body part of the case so as to face the coil.

13. A manufacturing method for an optical unit with a shake correction function comprising a movable body comprising a holder which holds an optical module on its inner side, a fixed body which swingably supports the movable body through a support mechanism, the support mechanism that swingably supporting the movable body around a first axial line intersecting an optical axis direction and swingably supporting the movable body around a second axial line intersecting the optical axis direction and the first axial line, and a shake correction drive mechanism structured to swing the movable body, the manufacturing method comprising:
previously structuring an end part, on one side in an optical axis direction, of the fixed body as an opened end;
supporting the holder by the fixed body through the support mechanism before the optical module is held by the holder;
attaching the optical module to an inner side of the holder through the opened end; and
structuring a swing restriction part by using the opened end with which a protruded part of the movable body protruded through the opened end to the one side in the optical axis direction is abutted when the movable body is swung and thereby a swing range of the movable body is restricted;
wherein the swing restriction part faces the protruded part and is configured to abut with the protruded part when the movable body is swung;
wherein the one side in the optical axis direction is an image side in the optical axis direction;
wherein the movable body comprises a stopper member connected with an end part, on the one side in the optical axis direction, of the holder, and the stopper member structures the protruded part; and
wherein the swing restriction part is formed to be an inclined face which is obliquely inclined with respect to the optical axis direction and is structured to surface-contact with a side face of the protruded part when the movable body is swung.

14. The manufacturing method for an optical unit with a shake correction function according to claim 13, wherein
in order to provide the stopper member as the protruded part which is to be connected with an end part, on the one side in the optical axis direction, of the holder, a plurality of kinds of stopper members having different masses is previously prepared, and
a stopper member among the plurality of kinds of the stopper members structured to improve mass balance of the movable body in the optical axis direction is connected with the holder.

15. The manufacturing method for an optical unit with a shake correction function according to claim 13, wherein
the support mechanism comprises a gimbal mechanism structured between the movable body and the fixed body and a plate-shaped spring whose one end part is connected with the movable body and the other end part is fixed to the fixed body,
the fixed body comprises a cover in a frame shape and a frame in a frame shape which is connected with the cover on the one side in the optical axis direction and holds the other end part of the plate-shaped spring together with the cover, and
the cover and the frame is manufactured by a metal injection method in which a molding body made by injecting metal powder and a binder to a die is sintered.

16. The manufacturing method for an optical unit with a shake correction function according to claim 13, wherein
the support mechanism comprises a gimbal mechanism structured between the movable body and the fixed body and a plate-shaped spring whose one end part is connected with the movable body and the other end part is fixed to the fixed body,
the fixed body comprises a cover in a frame shape and a frame in a frame shape which is connected with the cover on the one side in the optical axis direction and holds the other end part of the plate-shaped spring together with the cover,
the frame structures the opened end,
the cover and the frame are made of metal material, and
the cover and the frame are connected with each other by welding.

17. The manufacturing method for an optical unit with a shake correction function according to claim 16, wherein
the fixed body comprises a case made of metal which covers the cover from an outer side,
the case is provided with a cut-out part,
the cover is provided with a protruded part which is fitted to the cut-out part without protruding from an outer face of the case, and
an inner face of the cut-out part and the protruded part are connected with each other by welding the case with the cover.

* * * * *